June 21, 1960  R. CORDOBA  2,941,758
DEVICE FOR ROTATING AN AIRCRAFT WHEEL PRIOR TO LANDING
Filed May 29, 1956  4 Sheets-Sheet 1

Inventor
RUPERTO CORDOBA
By Young, Emery
& Thompson
Attorneys

June 21, 1960   R. CORDOBA   2,941,758
DEVICE FOR ROTATING AN AIRCRAFT WHEEL PRIOR TO LANDING
Filed May 29, 1956   4 Sheets-Sheet 2

Inventor
RUPERTO CORDOBA
By Young, Emery + Thompson
Attorneys

June 21, 1960 R. CORDOBA 2,941,758
DEVICE FOR ROTATING AN AIRCRAFT WHEEL PRIOR TO LANDING
Filed May 29, 1956 4 Sheets-Sheet 3
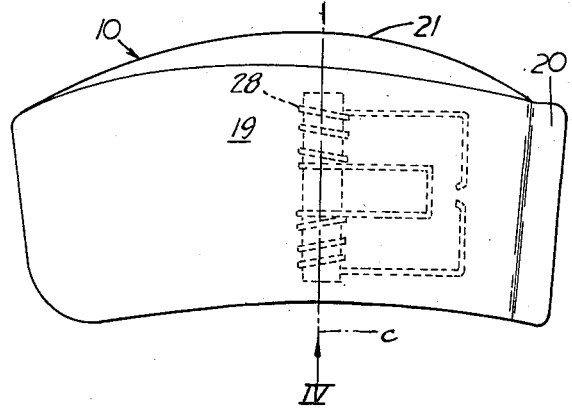
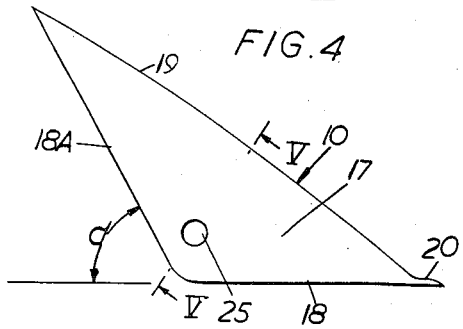
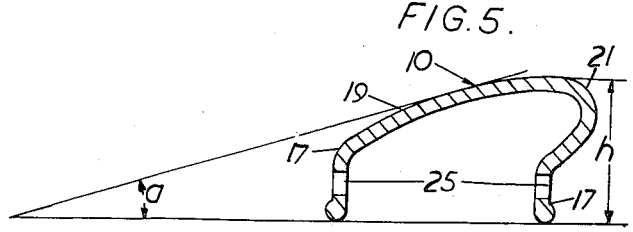
Inventor
RUPERTO CORDOBA
By *Young, Emory & Thompson*
Attorneys June 21, 1960 R. CORDOBA 2,941,758
DEVICE FOR ROTATING AN AIRCRAFT WHEEL PRIOR TO LANDING
Filed May 29, 1956 4 Sheets-Sheet 4
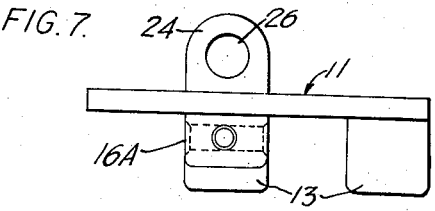
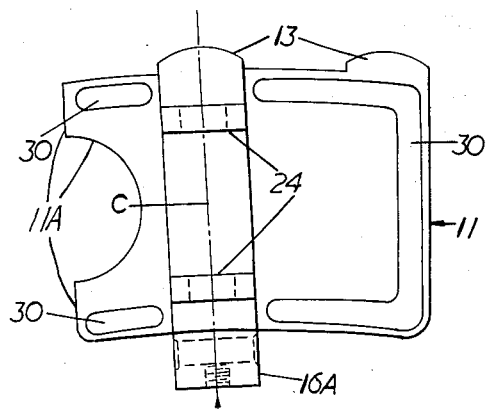
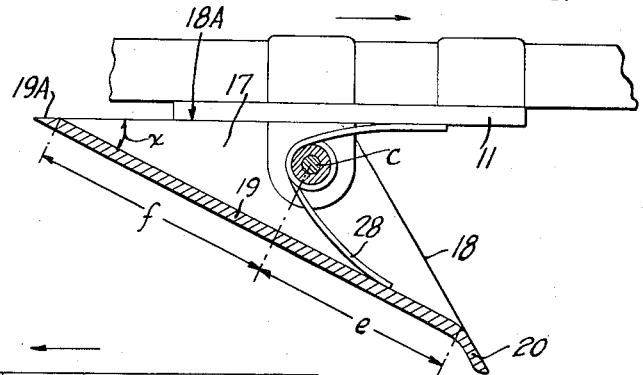
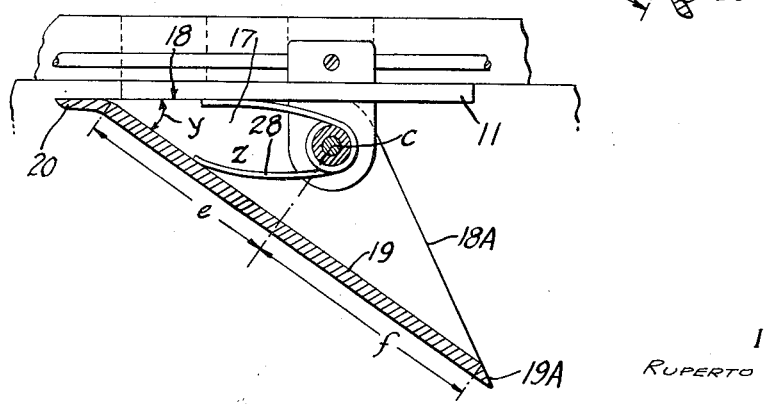
Inventor
RUPERTO CORDOBA
By Young, Emery
& Thompson
Attorneys

United States Patent Office 2,941,758
Patented June 21, 1960

2,941,758

DEVICE FOR ROTATING AN AIRCRAFT WHEEL PRIOR TO LANDING

Ruperto Cordoba, 22 Burnfoot Place, Kilmarnock, England

Filed May 29, 1956, Ser. No. 588,174

Claims priority, application Great Britain June 2, 1955

10 Claims. (Cl. 244—103)

The invention relates to a device for rotating an aircraft wheel prior to landing.

It is well known that when aircraft land the severe frictional forces between the tyre of the non-rotating wheel and the landing ground cause great wear on the tyre. Indeed, with the heavier types of wheel, tyres must be scrapped or re-treaded after as few as eight to ten landings.

It is an object of the invention to provide a device for rotating the wheel prior to landing so that the heavy wear on the tyre is reduced.

A further object of the invention is to provide a device for rotating an aircraft wheel prior to landing, comprising a series of peripherally equispaced flaps mounted at a side of said wheel and each adapted for pivotal movement on an axis lying in a plane substantially radial to the wheel axis, the flaps being urged to a narrow-angle position but adapted to be moved at a predetermined instant from the narrow-angle position to a wide-angle position by the airstream prior to the aircraft landing, the airstream catching the wide-angle flaps to effect rotation of the aircraft wheel.

An embodiment of the invention will now be described, by way of example, with reference to the accompanying drawings, in which:

Fig. 3 is a view showing one of the flaps of the device.

Fig. 4 is a view in the direction of arrow IV of Fig. 3.

Fig. 5 is a section on the line V—V of Fig. 4.

Fig. 6 is a view showing a flap mounting.

Fig. 7 is a view in the direction of arrow VII of Fig. 6.

Fig. 8 is a top sectional plan view of a flap at an upper position on the wheel, and Fig. 9 is a top sectional plan view of a flap at a lower position on the wheel.

Figure 1:
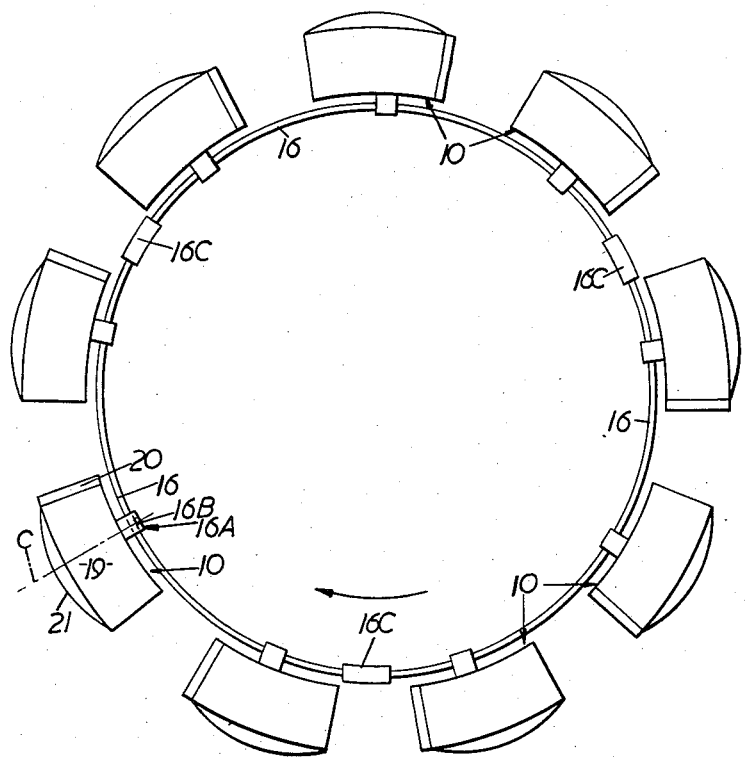
Fig. 1 is a diagrammatic side view of a device for rotating an aircraft wheel prior to landing, the device being detached from the wheel.
Figure 2:
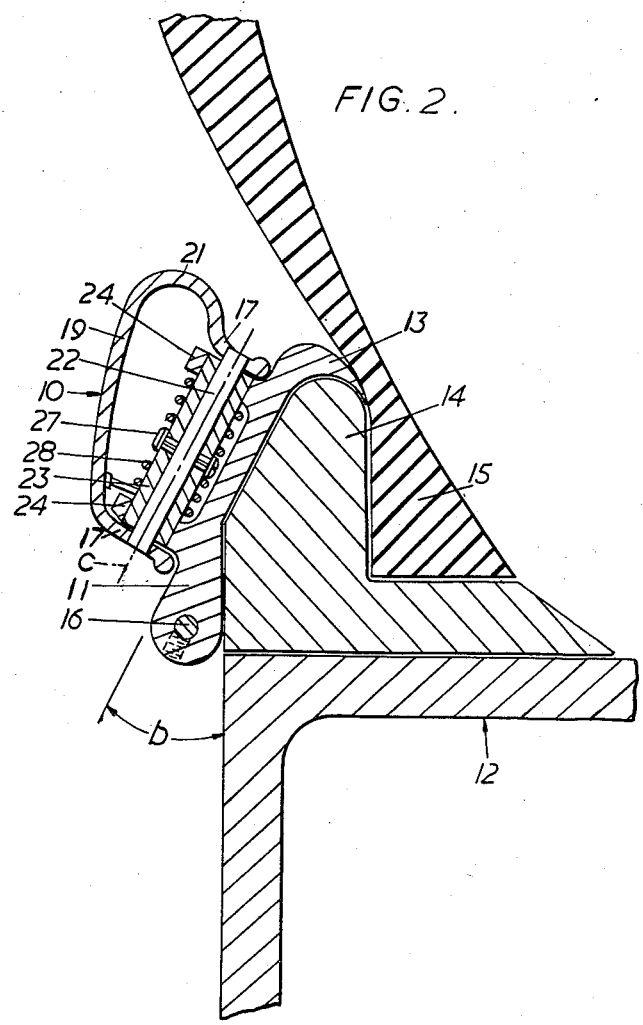
Fig. 2 is a fragmentary sectional view of the device in position on an aircraft wheel.

Referring to the drawings, a device for rotating an aircraft wheel prior to landing comprises a series of nine flaps 10 mounted on base plates 11 which are secured to the wheel 12 at an angle $b$ of approximately 26°. The base plates 11 lie equispaced circumferentially, the series being concentric with the wheel and located at the side thereof. The flaps at lower positions on the wheel are engaged by the aircraft slipstream to rotate the wheel.

At their outer ends the base plates are each provided with a pair of hooks 13 which are inserted between the wheel rim 14 and the base of the tyre 15, the hooks being locked between these two parts when the tyre is inflated. The inner ends of the base plates are attached to a retaining ring 16, the purpose of which is to position the plates positively and prevent the inner ends of the plates flying outwards under centrifugal force when the wheel rotates. The ring passes through lugs 16A and is clamped by set screws 16B. The ring 16 is formed from aluminium alloy and in three segments. The ends of the segments are held by double-threaded nuts 16C. The plates are also made from aluminium alloy.

Referring to Figs. 3, 4 and 5, the flaps 10 are also formed from aluminium alloy and each comprises a vane 19 forming the base of a channel-section member with obtuse-angled triangular side walls 17. The vane 19 is about 5⅜ inches long and the walls 17 are about 2½ inches apart. The maximum height $h$ of the channel member is 1⅝ inches. The shorter wall edge 18 is 2⅜ inches long and the longer wall edge 18A is 3 inches long, the outwardly-turned flange portion 20 of the vane 19 being approximately ⅜ inch long and constituting projection means for the purpose hereinafter described. Angle $d$ is approximately 60 degrees. The angle $a$ (Fig. 5) at which the vane 19 lies is approximately 20 degrees.

To reduce twisting of the flaps 10 they are formed of generally arcuate shape, the arcs being about the centre of the aircraft wheel 12. The outer edge 21 of the flap is curved as shown, and the pivot axis of the flap is indicated at C.

Each flap 10 is mounted on its base plate 11 by means of transverse Phosphor bronze pin 22 which forms a substantially radial pivot for the flap and which is located in a sleeve 23 carried by a pair of lugs 24 extending upwardly from the base plate. The pins 22 pass into apertures 25 near the apices of the edges 18 and 18A of the side walls, the lugs 24 being located inside the flaps so that the flaps present a smooth exterior. The pin 22 is a push fit in the apertures 25 and a running fit in the sleeve 23; the sleeve is a push fit in a pair of apertures 26 in the lugs 24. A split pin 27 passes through a slot in the sleeve 23 and is entered in the pin 22 to hold the parts together. Washers are provided at the ends of the pin 27.

A coil spring 28 is provided round each sleeve and acts between the base plate and the flap to hold the flap against the base plate, i.e. with the longer edges 18A of the side walls abutting the base plate.

To prevent damage to the flaps 10, rubber inserts 30 are provided in each base plate to reduce the effect of bumping of the flap against the base plate.

Figs. 3, 8 and 9 show the pivotal axis $c$ dividing the vane 19 into a minor portion $e$ which leads in respect of the direction of rotation of the wheel and a major portion $f$ which trails in respect of the direction of rotation of the wheel. With the trailing wall edges 18A engaging the base plate 11 (Fig. 8), the vane 19 lies at a narrow angle $x$ outwards from the wheel. With the leading wall edges 18 engaging the base plate 11 (Fig. 9), the vane 19 lies at a wide angle $y$ outwards from the wheel and moreover forms a pocket $z$ with the base plate 11 and side walls 17.

When out of use the flaps all lie in the narrow-angle low-resistance position (Fig. 8). However, when the aircraft wheel is submitted to the passing airstream, each flap at the bottom position on the wheel has its outwardly turned flange portion 20 caught by the airstream. This raises the trailing edge 19A against spring action and brings the flap into a wide-angle high-resistance position (Fig. 9) so that air is caught in the flap which acts like a pocket or scoop. The springs 28 are of such strength that each flap rocks to the wide-angle position about 20 degrees before the bottom-dead-centre position and moves to the narrow-angle position again about 30 degrees beyond the bottom-dead-centre position.

As can be seen from Fig. 8 the flaps, in the narrow-angle position, lie closely adjacent to the wheel tyre.

In use, the device causes rotation of the aircraft wheel to reduce the frictional force between the tyre and the run-way which causes such great wear on the tyre. It will be understood that when the peripheral speed of the wheel reaches the speed of the airstream, the flaps 10 will remain in the narrow-angle position under spring action so that the wheel speed does not become too great—this would also cause tyre wear.

Important features of the device are that it is light in weight and compact.

The above described example is intended for use with large wheels, 64 inches in overall diameter, of a fully retractable under-carriage.

The flaps described above are pressure cast from aluminium alloy, are then finished to a fine polish and subsequently heat-treated and anodised as is usual for aircraft parts. The flaps are approximately 0.1 inch thick and are used with a double torsion spring (28) of 3 pounds strength. It will be appreciated that the spring strength will be chosen to suit the size of flap.

It will be appreciated that for the two main wheels of an aircraft, two devices will be required, the flaps of one being mirror images of the flaps of the other.

I claim:

1. A device for rotating an aircraft wheel prior to landing, comprising a series of flaps for equispaced location around the wheel, pivotal mountings carrying said flaps and adapted to be secured to the wheel, each mounting permitting rocking movement of the flap about a substantially radial axis, spring means on each mounting tending to maintain each flap in a position offering low resistance to the airstream, and projection means on each flap which when the flap reaches a low position on the wheel is struck by the airstream to cause pivoting of the flap against spring action into a position offering high resistance to the airstream.

2. A device for rotating an aircraft wheel prior to landing, comprising a series of flaps for equispaced location around the wheel periphery at a side of the wheel, pivotal mountings carrying said flaps and adapted to be secured to the wheel, each flap comprising a vane and each mounting permitting rocking movement of the vane about a substantially radial axis located intermediate the vane ends to divide the vane unequally into a minor portion leading in respect of the direction of wheel rotation and a major portion trailing in respect of the direction of wheel rotation, spring means on each mounting tending to rock each vane to a shallow-angle position with the major portion nearest the wheel, and an outwardly projecting flange on the minor portion of the vane, the action of the airstream on said flange causing rocking of the vane against spring action to a steep-angle position with the minor portion nearest the wheel, when the vane reaches a lower position on the wheel.

3. A device for rotating an aircraft wheel prior to landing, comprising a series of flaps for equispaced location around the wheel periphery at a side of the wheel, pivotal mountings carrying said flaps, each mounting permitting rocking movement of the flap about a substantially radial axis and including a base plate adapted to be secured to the wheel, and each flap including a vane spaced outwards from the base plate and pivotal towards the base plate to form therewith a pocket offering a high resistance to the airstream, spring means on each mounting tending to maintain each vane in a position offering low resistance to the airstream, and projection means on the vane, the action of the airstream on the projection means pivoting the vane against spring action to pocket-forming position against the base plate when the vane reaches a low position on the wheel.

4. The device according to claim 3, wherein each vane extends to both sides of the flap's pivotal axis, the side of the vane leading with respect to the direction of rotation of the wheel constituting a minor portion of the vane, said minor portion having the projection means thereon and being engageable with the base plate to set the vane at a steep angle for high resistance to the airstream, and the side of the vane trailing with respect to the direction of rotation of the wheel constituting a major portion of the vane and being engageable with the base plate under spring action to set the vane at a shallow angle for low resistance to the airstream.

5. The device according to claim 4, wherein each vane comprises the base of a channel-section flap, the side walls of said flap being apertured to receive a pivot pin of the pivotal mounting and forming side walls of the pocket.

6. The device according to claim 5, wherein each mounting comprises a base plate having upstanding lugs carrying the pivot pin, hook means on the base plate for insertion between the wheel rim and the tyre, and a split ring threadable through apertures in the peripheral series of base plates and closable to lock the base plates in hooked position on the wheel.

7. The device according to claim 6, wherein the spring means comprises torsion springs each coiled around a pivot pin and engaging the base plate and flap.

8. A device according to claim 7, in which the side walls of the channel-section flap are formed as obtuse-angled triangles, the pivot pin being located at the obtuse angle.

9. A device for rotating an aircraft wheel prior to landing, comprising a plurality of flaps for spaced location around the wheel, pivotal mountings carrying said flaps and adapted to be secured to the wheel, each mounting permitting rocking movement of the flap about a substantially radial axis, resilient means on each mounting tending to maintain each flap in a position offering low resistance to the airstream, and projection means on each flap which when the flap reaches a low position on the wheel is struck by the airstream to cause pivoting of the flap against the action of the resilient means into a position offering high resistance to the airstream.

10. In an aircraft wheel, a device for rotating the wheel, comprising a plurality of flaps spaced around the wheel, pivotal mountings carrying said flaps, each mounting permitting rocking movement of the flap about a substantially radial axis, resilient means on each mounting tending to maintain each flap in a position offering low resistance to the airstream, and projection means on each flap which when the flap reaches a low position on the wheel is struck by the airstream to cause pivoting of the flap against the action of the resilient means into a position offering high resistance to the airstream.

References Cited in the file of this patent

UNITED STATES PATENTS

| 2,397,319 | Johnson | Mar. 26, 1946 |
| 2,435,459 | Oden | Feb. 3, 1948 |

FOREIGN PATENTS

| 556,068 | Great Britain | Sept. 20, 1943 |